Dec. 30, 1924.
K. H. POYAS
1,521,045
CARRIER FOR AUTOMOBILE CURTAINS AND THE LIKE
Filed April 29, 1922
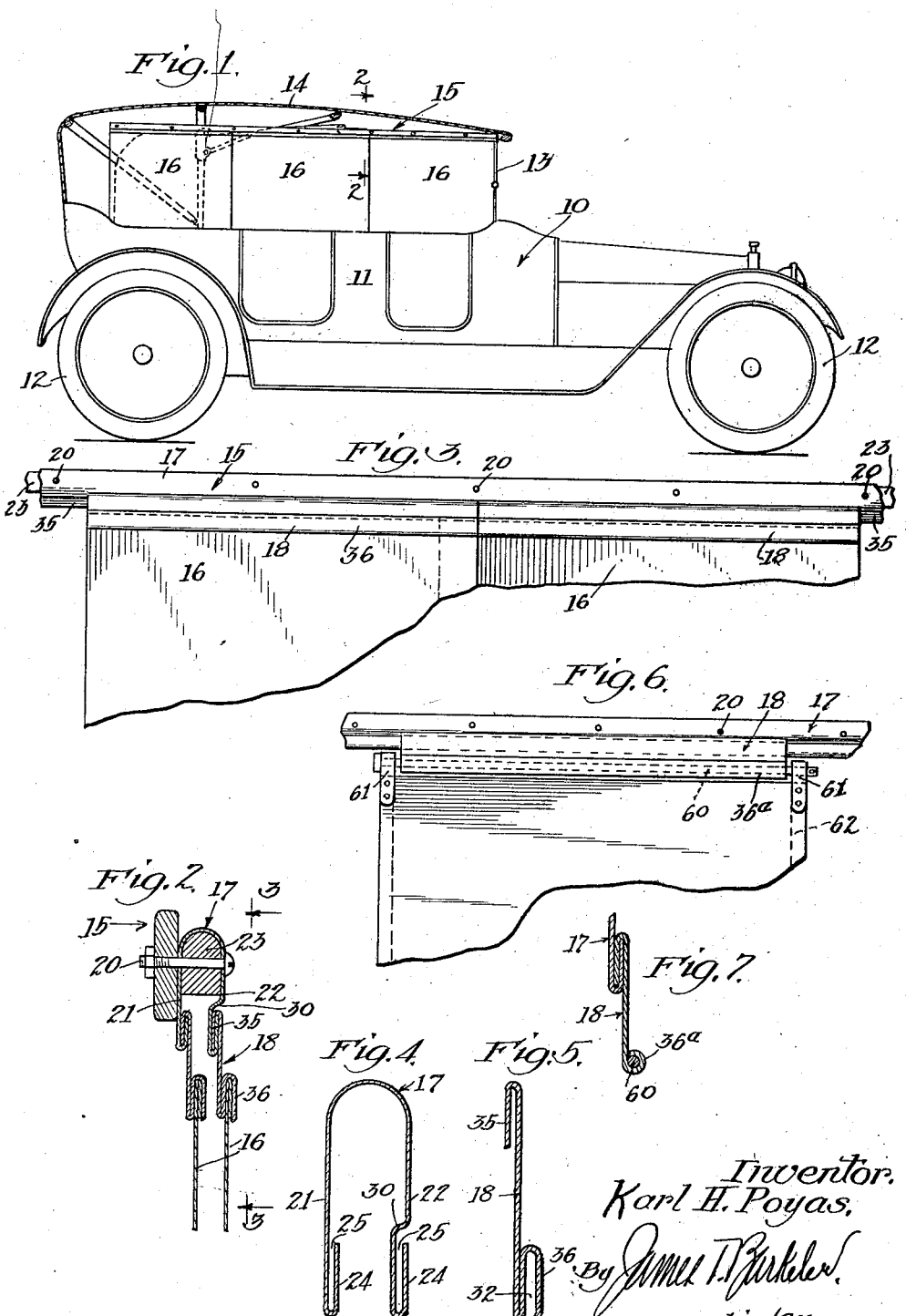

Patented Dec. 30, 1924.

1,521,045

UNITED STATES PATENT OFFICE.

KARL H. POYAS, OF LOS ANGELES, CALIFORNIA.

CARRIER FOR AUTOMOBILE CURTAINS AND THE LIKE.

Application filed April 29, 1922. Serial No. 557,284.

*To all whom it may concern:*

Be it known that I, KARL H. POYAS, a citizen of the United States, residing at Los Angeles, in the county of Los Angeles and State of California, have invented certain new and useful Improvements in Carriers for Automobile Curtains and the like, of which the following is a specification.

This invention has to do with a carrier for curtains, and the like, and relates more particularly to a carrier or supporting means for automobile curtains. It is an object of this invention to provide a simple, effective, inexpensive device of the character specified.

An object of this invention is to provide a curtain carrier particularly adapted to carry automobile side curtains and which carries curtains so that they are evenly and effectively supported so that they can be easily removed, and so that they can be easily and conveniently moved or shifted as desired.

Further it is an object of this invention to provide a curtain carrier which is effective and convenient, yet extremely simple and inexpensive. The present carrier in its preferred form includes a very few simple parts, is made or formed of inexpensive material, and is such that it can be formed or made economically and without expensive or special machinery.

The various objects and features of the invention will be best and more fully understood from the following detailed description of a typical preferred embodiment of the invention, throughout which reference is had to the accompanying drawings, in which:

Fig. 1 is a side elevation of a typical motor vehicle equipped with the device of the present invention, the top of the vehicle being shown in section in order to clearly show the manner of arranging the device in connection with it; Fig. 2 is an enlarged detail transverse sectional view taken as indicated by line 2—2 on Fig. 1; Fig. 3 is a reduced view taken as indicated by line 3—3 on Fig. 2; Fig. 4 is an enlarged sectional view of the carrier provided by the present invention; Fig. 5 is an enlarged sectional view of the hanger provided by the present invention; Fig. 6 is a view similar to Fig. 3 of another form of construction; and Fig. 7 is a view similar to Fig. 5 of the form of construction shown in Fig. 6.

Throughout the drawings numeral 10 designates a typical motor vehicle including a body 11, supporting wheels 12, a windshield 13, and a top 14. The device 15 provided by the present invention is attached to the inner side of the side part of the top 14 and carries curtains 16 which extend between the top 14 and body 11 in the manner usual to automobile side curtains.

The device provided by the present invention comprises a stationary carrier 17, which is attached to the top 14, and a plurality of hangers 18 which hold the curtains 16 and attach to, or are supported by, the carrier 17. In accordance with the present invention the carrier 17 is formed from a straight strip of sheet metal and is generally U-shaped in cross sectional configuration. The carrier 17 is arranged within the top 14, so that its side parts 21 and 22 extend downwardly, and is attached to the various bows and brace members of the top by means of suitable bolts 20. The bolts 20 preferably extend through the inner portions of the legs or side parts 21 and 22 of the carrier 17 and a filler 23, of wood, or the like, is arranged between the side parts where the bolts extend through them so that the carrier will not be distorted when the bolts are made tight. The filler 23 is effective in stiffening or reinforcing the carrier 17 and in preventing the carrier from vibrating. The outer end portions 24 of the side parts 21 and 22 are bent back or upwardly to form upwardly opening grooves or channels 25. The outer end portion 24 of the side part 21 is bent inwardly to form the channel 25, while the outer end portion 24 of the side part 22 is bent outwardly to form the channel 25. The side part 22 is bent inwardly and then downwardly at a point immediately above the top of the channel 25 so that there is a part 30 which overhangs the channel 25.

In accordance with the preferred form of the invention there is one hanger 18 for each curtain 16, which hanger extends the entire length of the curtain and holds the curtain throughout its length. Each hanger 18 is formed from a straight strip of sheet-metal and has its upper portion 35 bent back or downwardly forming a hook adapted to engage, or be slidably carried in, one of the channels 25 of the carrier 17. The lower edge portion 36 of the hanger 18 is bent back or upwardly and then downwardly to form a downwardly opening channel 32 adapted to receive and hold the upper edge of a curtain. In accordance with the preferred form of the invention the parts of the hanger which form the channel 32 are designed and proportioned so that the hanger can be effectively attached to the upper edge of the curtain by arranging the edge of the curtain in the channel 32 and then hammering or squeezing the channel portion of the hanger until the edge of the curtain is firmly and securely gripped.

The hangers 18 carrying the curtains 16 are arranged in connection with the carriers 17 so that their downwardly turned upper edge portions 35 are carried in the channels 25 of the carrier 17. The portions 35 of the hangers may be arranged in the channels 25 from the end of the carrier 17. In order that the ends of adjacent curtains 16 may be overlapped it is preferred that the hangers 18 carrying adjacent curtains be arranged in opposite channels 25. The hangers 18 carried in the channel 25 of side parts 21 are prevented from becoming displaced by the filler 23, while the hangers 18 carried in the channel 25 of the side part 22 are prevented from becoming displaced by the overhanging part 30.

In practice it is not desirable to form both of the channels 25 by turning the outer end portions of both of the side parts inwardly as this would necessitate making the carrier comparatively wide in order to prevent interference between the hangers carried by the two channels.

In Figs. 6 and 7 I show a form of construction which is particularly convenient and desirable. The lower edge portion 36ª of the hanger is turned to slidably carry a rod 60. The rod 60 projects from the ends of the hanger and extends through loops 61 attached to the upper corners of the frame 62 of the curtain. The rod 60 pivotally connects the curtain with the hanger and is removable to allow the curtain to be detached from the hanger. With this form of construction the curtains can be swung in or out as well as moved lengthwise.

From the foregoing description it will be obvious how the device of the present invention may be easily and inexpensively formed of comparatively light inexpensive material, and it will be obvious how the hangers 18 operate to very effectively and conveniently carry the curtains 16. The hangers, in extending the entire length of the curtains and in being supported throughout their length by the carrier, hold the curtains securely and uniformly and may be made of comparatively light material and still be rigid and strong. The hangers 18 may, of course, be moved longitudinally in the channels 25 when it is desired to shift or move the curtains. With adjacent pairs of hangers 18 arranged in opposite channels 25 the curtains can be arranged so that their edges overlap and can be moved so that they completely overlap if so desired. In practice the lower edges of the curtains may be releasably attached to the body of the vehicle so that the curtains are held tightly in place. When the curtains are not desired the hangers may be removed from the carrier and the curtains rolled onto them, the carrier being left in place being only removed when it is desired to put the top down.

Having described only a preferred form of my invention, I do not wish to limit myself to the particular details hereinabove set forth but wish to reserve to myself any changes or variations that may appear to those skilled in the art or fall within the scope of the following claims.

Having described a preferred form of my invention, I claim:

1. A curtain carrying device including, a stationary U-shaped carrier having the outer end portion of one of its side parts turned inwardly to form an upwardly opening channel and having the outer end portion of its other side part turned outwardly to form an upwardly opening channel, a filler in the inner portion of the carrier, and hangers attached to the curtains and having their upper edge portions turned so that they are slidably carried in the channels, the filler acting to prevent displacement of the turned parts of the hangers from the channel of the first mentioned side part.

2. A curtain carrying device including, a stationary U-shaped carrier having the outer end portion of one of its side parts turned inwardly to form an upwardly opening channel and having the outer end portion of its other side part turned outwardly to form an upwardly opening channel, one of the side parts having a part overhanging its channel, and hangers attached to the curtains and having their upper edges turned downwardly and slidably carried in said channels.

3. A curtain carrying device including, a stationary U-shaped carrier formed of a single strip of sheet metal, the outer end portion of one of the side parts of the carrier extending inwardly and upwardly to form an upwardly opening channel, the outer end portion of the other side part of the carrier extending outwardly and upwardly to form an upwardly opening channel, the last mentioned side part having a part overhanging its channel, a wooden filler in the inner portion of the carrier, and curtain hangers each formed of a single strip of sheet metal, the upper edge portion of each hanger being turned to extend downwardly and being slidably carried in one of said channels and the lower edge portion of each hanger being turned upwardly and then downwardly forming a downwardly opening channel adapted to hold the edge of a curtain.

4. A curtain carrying device including, a stationary U-shaped carrier formed of a single strip of sheet metal, the outer end portion of one of the side parts of the carrier extending inwardly and upwardly to form an upwardly opening channel, the outer end portion of the other side part of the carrier extending outwardly and upwardly to form an upwardly opening channel, the last mentioned side part having a part overhanging its channel, a wooden filler in the inner portion of the carrier, and curtain hangers each formed of a single strip of sheet metal, the upper edge portion of each hanger being turned to extend downwardly and being slidably carried in one of said channels.

In witness that I claim the foregoing I have hereunto subscribed my name this 19th day of April, 1922.

KARL H. POYAS.